(12) United States Patent
Arita

(10) Patent No.: US 8,537,411 B2
(45) Date of Patent: Sep. 17, 2013

(54) APPARATUS AND METHOD OF CONTROLLING AN IMAGE FORMING APPARATUS THAT FORMS AN IMAGE ON A CONTINUOUS ROLL SHEET

(75) Inventor: Shunsuke Arita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 256 days.

(21) Appl. No.: 13/033,270

(22) Filed: Feb. 23, 2011

(65) Prior Publication Data
US 2011/0211224 A1 Sep. 1, 2011

(30) Foreign Application Priority Data

Mar. 1, 2010 (JP) ................................. 2010-044290
Feb. 10, 2011 (JP) ................................. 2011-027281

(51) Int. Cl.
*G06K 15/00* (2006.01)
(52) U.S. Cl.
USPC ....... 358/1.18; 358/1.15; 242/548.2; 347/104
(58) Field of Classification Search
USPC ...................... 358/1.12, 1.15, 1.18
See application file for complete search history.

(56) References Cited

U.S. PATENT DOCUMENTS

| 6,120,142 | A | 9/2000 | Eltgen et al. |
| 2002/0067499 | A1* | 6/2002 | Sakamoto et al. ........... 358/1.12 |
| 2003/0026619 | A1* | 2/2003 | Miyoshi et al. ................. 399/19 |
| 2009/0147312 | A1* | 6/2009 | Inada ........................... 358/1.18 |
| 2010/0026738 | A1* | 2/2010 | Saikawa et al. .................... 347/1 |

FOREIGN PATENT DOCUMENTS

| JP | 8-2017 | 1/1996 |
| JP | 2001-253144 | 9/2001 |
| JP | 4256672 | 2/2009 |

* cited by examiner

*Primary Examiner* — Benny Q Tieu
*Assistant Examiner* — Juan M Guillermety
(74) *Attorney, Agent, or Firm* — Oblon, Spivak, McClelland, Maier & Neustadt, L.L.P.

(57) ABSTRACT

An apparatus for controlling an image forming apparatus obtains image data to be formed on a continuous roll sheet that includes front-side image data and back-side image data. The apparatus generates page allocation information that indicates to combine a part of the front-side image data and a part of the back-side image data that are overlapped with each other in the main scanning direction into drawing data.

10 Claims, 11 Drawing Sheets

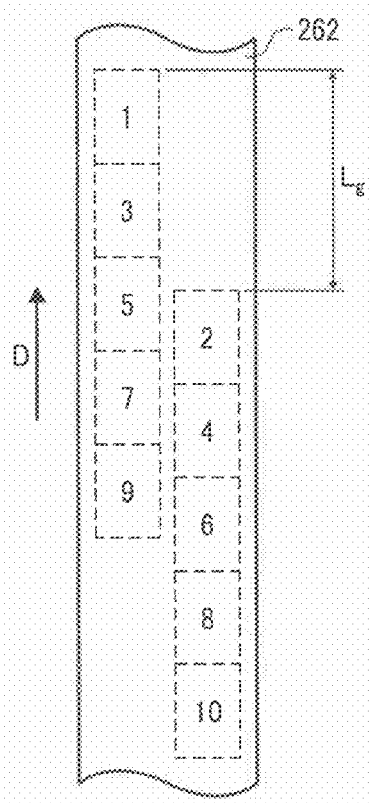
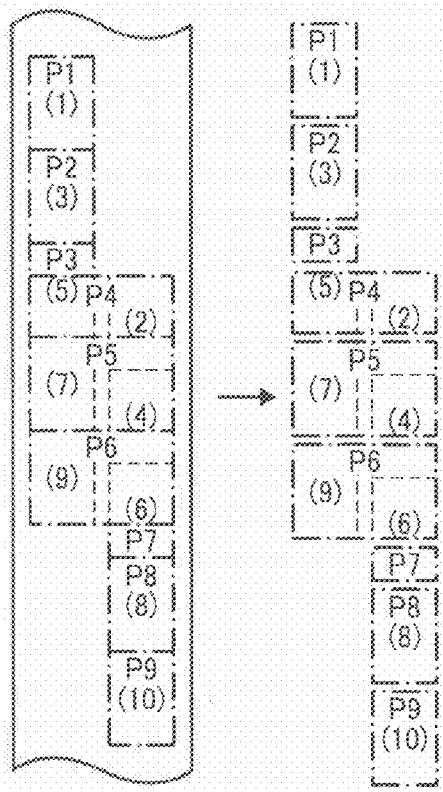

US 8,537,411 B2

APPARATUS AND METHOD OF CONTROLLING AN IMAGE FORMING APPARATUS THAT FORMS AN IMAGE ON A CONTINUOUS ROLL SHEET

CROSS-REFERENCE TO RELATED APPLICATIONS

This patent application is based on and claims priority under 35 U.S.C. §119 to Japanese Patent Application Nos. 2010-044290, filed on Mar. 1, 2010, and 2011-027281, filed on Feb. 10, 2011, in the Japanese Patent Office, the entire disclosure of which is hereby incorporated herein by reference.

FIELD OF THE INVENTION

The present invention generally relates to controlling an image forming apparatus, and more specifically to an apparatus and a method of controlling an image forming apparatus that forms an image on continuous roll paper.

BACKGROUND

Some recent image forming apparatuses such as printers, facsimiles, and copiers form images on continuous roll paper, thus increasing the overall printing speeds when compared with the case of forming images on cut paper. To form images on both sides of roll paper, the image forming apparatus may be implemented by a tandem type image forming apparatus in which a sheet reversing device is disposed between two image forming devices. Alternatively, the image forming apparatus may be implemented by a single engine duplex (SED) type image forming apparatus in which a single image forming device and a sheet reversing device are mainly provided, for example, as described in Japanese Patent Application Publication Nos. H08-2017 and 2001-253144.

More specifically, as described in Japanese Patent Application Publication No. H08-2017, a surface of a photoconductive drum that functions as the image forming device is divided into a first section for forming an image on one side of roll paper and a second section for forming an image on the other side of roll paper in the main-scanning direction. After the image is formed on the one side of roll paper using the first section of the photoconductive drum, the roll paper is turned over by the sheet reversing device. The roll paper is further transferred to a position that faces the second section of the photoconductive drum for image formation on the other side of roll paper.

In order to perform image formation on both sides of roll paper concurrently, the above-described SED type image forming apparatus is provided with a controller for controlling image formation on one side of roll paper and a controller for controlling image formation on the other side of roller paper. Since these two controllers need to be synchronized with each other, a structure of the controller or operation performed by the controller tends to become more complex. For example, in order to synchronize operations performed by the controllers, an additional interface is needed for each controller. On the other hand, it may be possible to cause a data input interface of the controller to perform synchronization operation. This, however, would lower the data transfer speeds, thus lowering the processing capability of the apparatus.

SUMMARY

Example embodiments of the present invention include an apparatus, method, system, computer program and product each capable of controlling an image forming apparatus having an image forming device therein. The apparatus obtains image data to be formed on a continuous roll sheet that includes front-side image data and back-side image data, and generates page allocation information that indicates to combine a part of the front-side image data and a part of the back-side image data that are overlapped with each other in the main scanning direction into drawing data.

For example, the apparatus obtains image data to be formed on a continuous roll sheet is obtained. The image data includes front-side image data to be formed on a front side of the continuous roll sheet and back-side image data to be formed on the back side of the continuous roll sheet. The apparatus obtains information regarding a reverse path length that indicates a length of path in which the continuous roll sheet travels in the image forming device between the time at which the front-side image data is formed on the front side of the continuous roll sheet and the time at which the back-side image data is formed on the back side of the continuous roll sheet. The apparatus allocates a first page of the front-side image data and a first page of the back-side image data at respective positions that are parallel with each other in the main scanning direction. The position of the first page of the front-side image data and the position of the first page of the back-side image data are separated from each other in the sub-scanning direction by a length determined based on the reverse path length. The apparatus generates page allocation information that indicates to combine a part of the front-side image data and a part of the back-side image data that are overlapped with each other in the main scanning direction into drawing data.

In addition to the above-described example embodiments, the present invention may be practiced in various other ways, for example, as an image forming system that includes a controller apparatus that generates drawing data, and an image forming apparatus that forms an image based on the drawing data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is an illustration for explaining page allocation of the image data of FIG. 6, performed by the image forming apparatus of FIG. 1, according to an example embodiment of the present invention;

FIG. 8 is an illustration for explaining operation of generating drawing data based on the page allocation of FIG. 7, performed by the image forming apparatus of FIG. 1, according to an example embodiment of the present invention;

Figure 1:
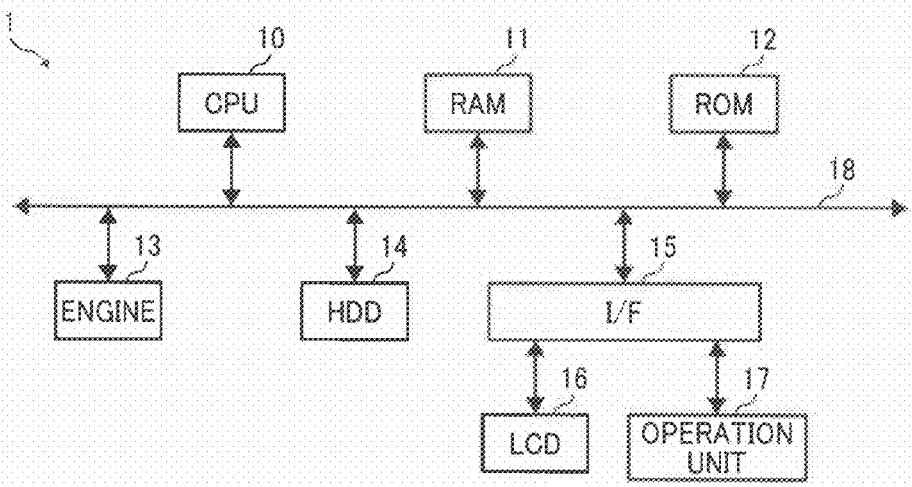
FIG. 1 is a schematic block diagram illustrating a hardware structure of an image forming apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to the drawings, an image forming apparatus that forms an image on both sides of continuous roll paper is explained according to an example embodiment of the present invention. In this example, the image forming apparatus includes a single image forming device that forms images on both sides of continuous roll paper using electrophotographic method.

FIG. 1 is a schematic block diagram illustrating a hardware structure of an image forming apparatus 1. As illustrated in FIG. 1, the image forming apparatus 1 includes an image processing device that may be provided in a general-purpose information processing device such as a server of a personal computer, and an image forming engine that performs image forming operation. More specifically, the image forming apparatus 1 includes a central processing unit (CPU) 10, a random access memory (RAM) 11, a read only memory (ROM) 12, an engine 13, a hard disk drive (HDD) 14, and an interface (I/F) 15, which are connected through a bus 18. FIG. 1 further illustrates a liquid crystal display (LCD) 16 and an operation unit 17, each of which are connected to the I/F 15.

The CPU 10 is a processor, which controls entire operation of the image forming apparatus 1. The RAM 11 is a volatile memory that stores various data in a form readable or writable by the processor with relatively high speeds. The RAM 11 functions as a work area of the CPU 10 for processing various data. The ROM 12 is a non-volatile memory that stores various data therein in a form readable by the processor. The ROM 12 stores a program such as firmware. The engine 13 causes the image forming apparatus 1 to perform image formation. The engine 13 includes a photoconductive drum, a mechanism that transfers a recording sheet, and a mechanism that reverses the recording sheet. Further, in this example, continuous roll paper is used as the recording sheet.

The HDD 14 is a nonvolatile recording medium in which various data is stored in a manner writable or readable. The HDD 14 may store an operating system (OS), various control programs, and application programs. The IN 15 connects various hardware resources to the bus 18 or a network. The LCD 16 functions as a user interface that allows the user to obtain information regarding the status of the image forming apparatus 1. The operation unit 17 functions as a user interface that allows the user to input various information to the image forming apparatus 1, such as a keyboard or a mouse.

In operation, the CPU 10 loads a control program from a memory such as the ROM 12, the HDD 14 or a recording medium such as an optical disc, onto the RAM 11, to cause the image forming apparatus 1 to function as a software controller that operates according to the control program. The software controller operates in cooperation with the hardware structure of the image forming apparatus 1 to realize one or more functional blocks as illustrated in FIG. 2.

Figure 2:
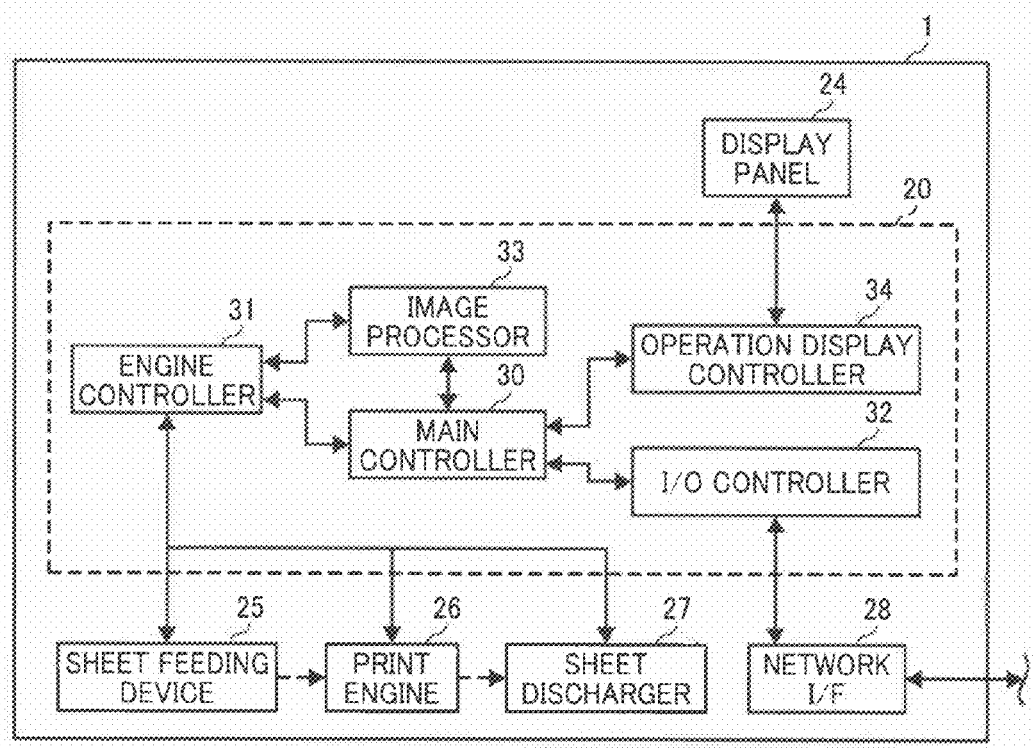
FIG. 2 is a schematic block diagram illustrating a functional structure of the image forming apparatus of FIG. 1.

Referring now to FIG. 2, a functional structure of the image forming apparatus 1 is explained according to an example embodiment of the present invention. As illustrated in FIG. 2, the image forming apparatus 1 includes a controller 20, a display panel 24, a sheet feeding device 25, a print engine 26, a sheet discharger 27, and a network I/F 28.

The controller 20 includes a main controller 30, an engine controller 31, an input/output (I/O) controller 32, an image processor 33, and an operation display controller 34. In FIG. 2, the solid line illustrates electrical connections among these devices, and the dot line illustrates the flow of recording sheet such as the flow of continuous roll paper.

The display panel 24, which may be implemented by a touch panel, functions as an output interface that displays the status of the image forming apparatus 1, and an input interface that allows the user to input various information to the image forming apparatus 1. The network I/F 28 is a communication interface that allows the image forming apparatus 1 to communicate with another device or apparatus through a network. For example, the network I/F 28 may be made in compliance with Ethernet or USB.

The controller 20 is implemented by software such as a plurality of instructions and hardware such as an integrated circuit. More specifically, the image forming apparatus 1 of FIG. 1 stores a control program in any desired nonvolatile memory such as ROM 12, HDD 14, or recording medium such as optical disc, for example, in the form of firmware. When executed, the CPU 10 loads the control program from the nonvolatile memory onto a volatile memory such as the RAM 11 to cause software and hardware resources of the image forming apparatus 1 to function as the controller 20. The controller 20 controls entire operation of the image forming apparatus 1.

The main controller 30 controls a process or a part that is included in the controller 20, for example, by sending an instruction to each process or part of the controller 20. The engine controller 31 controls or drives the print engine 26, sheet feeding device 25, or sheet discharger 27. The input/output (I/O) controller 32 inputs an input signal or an instruction to the main controller 30 according to data received through the network I/F 28. The main controller 30 controls the I/O controller 32 to access another device or apparatus through the network I/F 28.

The image processor 33 generates drawing data based on print data included in a print job under control of the main controller 30. The drawing data is any information that may be used by the print engine 26 for forming an image on the recording sheet. The print data included in the print job is generated by a printer driver of an information processing apparatus such as PC, based on image information. The print data is written in the language that is interpretable by the image forming apparatus 1. The operation display controller 34 causes the display panel 24 to display various data, or sends input data input through the display panel 24 to the main controller 30.

In printing operation, the I/O controller 32 receives a print job through the network I/F 28, for example, from the information processing apparatus. The I/O controller 32 sends the received print job to the main controller 30. The main controller 30 instructs the image processor 33 to generate drawing data based on print data included in the print job.

The engine controller 31 instructs the print engine 26 to form an image on the recording sheet that is carried by the sheet feeding device 25, based on the drawing data generated by the image processor 33. In this case, the print engine 26 functions as an image forming device. The recording sheet on which the image is formed is discharged from the sheet discharger 27.

Figure 3:
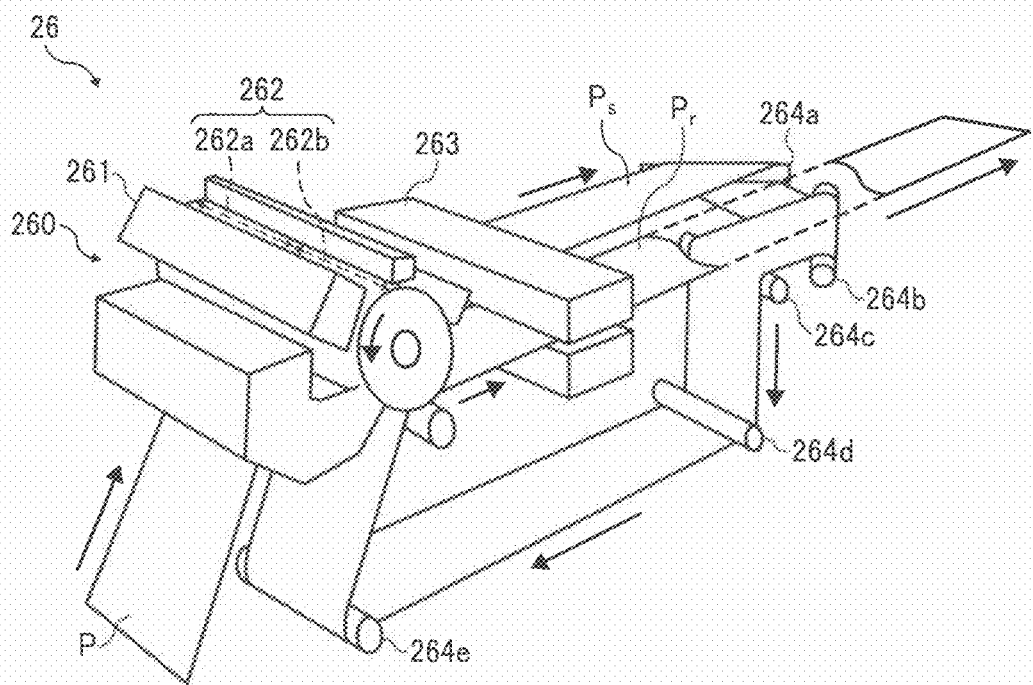
FIG. 3 is a perspective view illustrating a portion of a print engine of the image forming apparatus of FIG. 1, according to an example embodiment of the present invention.

Referring now to FIG. 3, a structure of the print engine 26 is explained according to an example embodiment of the present invention. As illustrated in FIG. 3, the print engine 26 is an engine designed for continuous roll paper printing, which forms an image on continuous roll paper P. The print engine 26 includes an image forming unit 260, a fixing unit 263, a first turn bar 264a, a second turn bar 264b, and reverse rollers 264c, 264d, and 264e. For the descriptive purposes, a selected portion of the paper P is shown in dot lines.

The image forming unit 260 forms an image on paper P using electrophotographic method. The image forming unit 260 includes an optical writing unit 261 and a photoconductive drum 262. The optical writing unit 261 irradiates a laser beam onto the surface of the photoconductive drum 262 to form a latent image onto the surface of the photoconductive drum 262. The image forming unit 260 further includes a developing device to develop the latent image formed onto the surface of the photoconductive drum 262 into a toner image. The toner image formed on the surface of the photoconductive drum 262 is transferred to the surface of paper P as paper P is conveyed in the direction indicated by the arrow.

In this example, the photoconductive drum 262 has a first surface section 262a and a second surface section 262b, which is divided in the main scanning direction. The first surface section 262a is a section on which a part of image to be formed on the front side Ps of paper P is formed. The second surface section 262b is a section on which a part of image to be formed on the back side Pr of paper P is formed. For the descriptive purposes, the first surface section 262a and the second surface section 262b may be referred to as the front-side transfer area 262a and the back-side transfer area 262b, respectively.

More specifically, as described below, the toner image formed onto the surface of the photoconductive drum 262 is divided into a part of image that is formed on the front-side transfer area 262a and a part of image that is formed on the back-side transfer area 262b. The part of image formed on the front-side transfer area 262a is transferred from the front-side transfer area 262a of the photoconductive drum 262 to the front side Ps of paper P as paper P is transferred in a manner that the front side Ps faces toward the image forming unit 260. The part of image formed on the back-side transfer area 262b is transferred from the back-side transfer area 262b of the photoconductive drum 262 to the back side Pr of paper P as paper P is transferred in a manner that the back side Pr faces toward the image forming unit 260. Further, as illustrated in FIG. 3, the print engine 26 is structured such that a path through which paper P is conveyed with the front side Ps being faced up is at the side towards the front-side transfer area 262a, and a path through which paper P is conveyed with the back side Pr being faced up is at the side towards the back-side transfer area 262b.

The fixing unit 263 fixes the toner image, which is formed by the image forming unit 260 onto paper P, onto paper P, for example, with heat and pressure. More specifically, the part of toner image formed on the front-side transfer area 262a is transferred to the front side Ps of paper P while paper P is conveyed in a manner the front side Ps faces toward the image forming unit 260. The paper P having the part of toner image is fixed onto the front side Ps by the fixing unit 263. As paper Ps is conveyed to turn bars 264a and turn bars 262b, and to reverse rollers 264c, 264d, and 264e, the front side Ps of paper P is reversed such that the back side Pr of paper P faces toward the image forming unit 260. At the image forming unit 260, the part of toner image formed on the back-side transfer area 262b is transferred to the back side Pr of paper P while paper P is conveyed in a manner the back side Pr faces toward the image forming unit 260. The paper P having the part of toner image is fixed onto the back side Pr by the fixing unit 263. The paper P having the images on both sides of paper is conveyed toward the sheet discharger 27.

As described above, the print engine 26 forms images on both sides of continuous roll paper using SED method. More specifically, the image forming unit 260 has an image forming area that is divided into the front-side transfer area 262a and the back-side transfer area 262b in the main scanning direction. The turn bars 264a and 264b, and reverse rollers 264c, 264d, and 264d together function as a transfer device that transfers continuous roll paper P, while reversing its side. The front side Ps of paper having the part of image transferred from the front-side transfer area 262a is reversed by the turn bars 264a and 264b, and reverse rollers 264c, 264d, and 264d to cause the back side Pr of paper to face toward the image forming unit 260.

Figure 4:
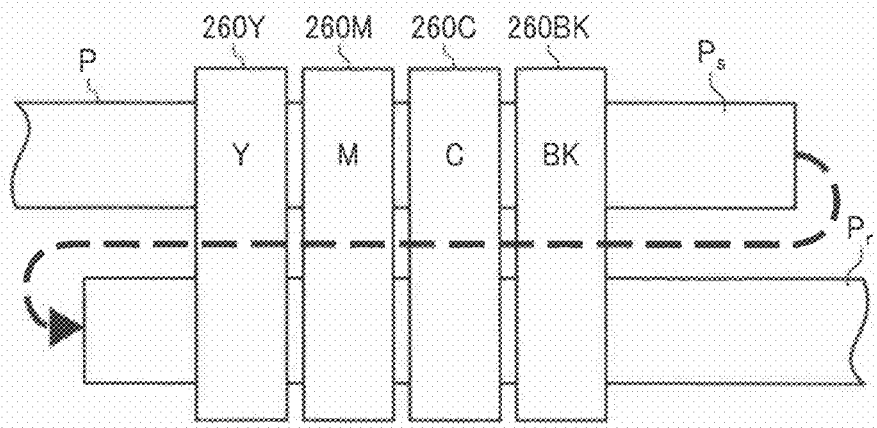
FIG. 4 is a schematic diagram illustrating a portion of a print engine of the image forming apparatus of FIG. 1, according to an example embodiment of the present invention.

In the above-described example illustrated in FIG. 3, the print engine 26 is provided with a single image forming unit 260 including a single set of the optical writing unit 261 and the photoconductive drum 262. Alternatively, as illustrated in FIG. 4, the print engine 26 may be implemented as a tandem-type image forming unit, which includes a yellow color image forming unit 260Y, a magenta color image forming unit 260M, a cyan color image forming unit 260C, and a black color image forming unit 260BK, which are arranged side by side.

In this example, the optical writing unit 261 is input with drawing data. The drawing data is generated by combining image data to be formed on the front side Ps of paper P ("front-side image data") and image data to be formed on the back side Pr of paper P ("back-side image data"). With this drawing data, a part of latent image is formed on the front-side transfer area 262a according to a part of the drawing data generated based on the front-side image data, and a part of latent image is formed on the back-side transfer area 262b according to a part of the drawing data generated based on the back-side image data.

In case of conventional SED method, front-side image data and back-side image data are respectively input to the optical writing unit 261. The optical writing unit 261 controls formation of latent image on the front-side transfer area 262a based on the front-side image data, and formation of latent image on the back-side transfer area 262b based on the back-side image data, respectively, according to information regarding conveyance of paper P. This results in complicated structure of controller circuit. Further, due to overhead that may be caused by processing of synchronization signals in addition to image data, the overall processing speeds for image formation decrease.

In the above-described example, the image processor 33 of the image forming apparatus 1 allocates front-side image data and back-side image data to a first side and a second side of a drawing area, respectively, to generate one drawing data. More specifically, the image processor 33 analyzes various information such as information regarding a document to be printed such as its total number of pages or information regarding the length of path through which paper P is conveyed, and determines allocation of front-side image data and back-side image data for each page of drawing data. Accordingly, the optical writing unit 261 that receives the drawing data generated based on front-side and back-side image data only needs to perform formation of a latent image based on the received drawing data, without performing additional control operation.

Figure 5:
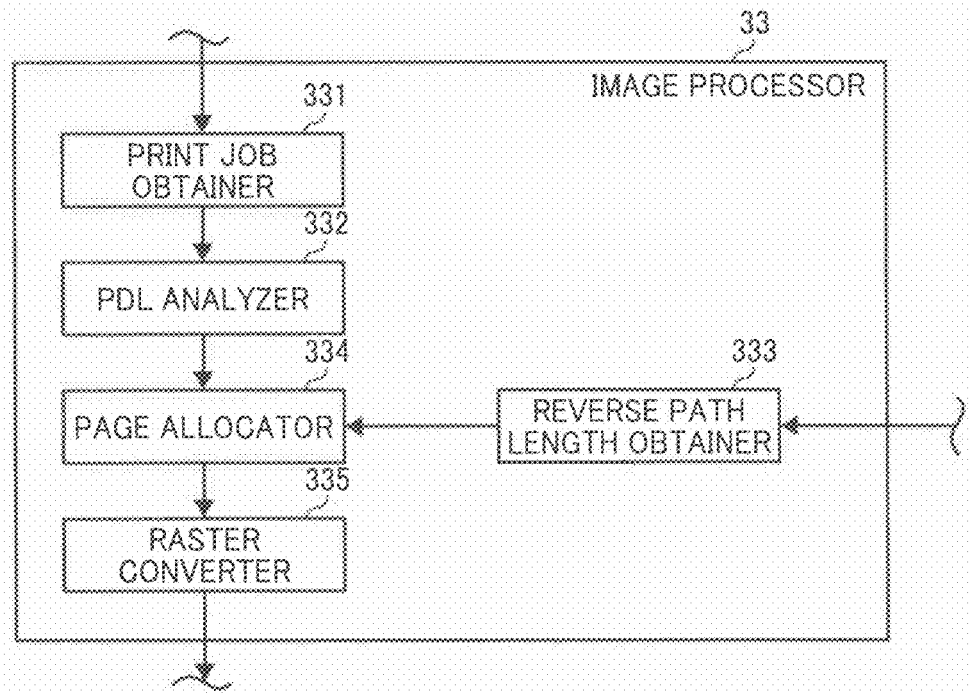
FIG. 5 is a schematic block diagram illustrating a functional structure of an image processor of the image forming apparatus of FIG. 1.

Referring now to FIG. 5, a functional structure of the image processor 33 is explained according to an example embodiment of the present invention. As illustrated in FIG. 5, the image processor 33 includes a print job obtainer 331, a PDL analyzer 332, a page allocator 333, a raster converter 334, and a reverse path length obtainer 335.

The print job obtainer 331 obtains the print job received through the I/O controller 32 under control of the main controller 30. The PDL analyzer 332 analyzes information regarding a page to be printed, which is included in the print job received by the print job obtainer 331. More specifically, the PDL analyzer 332 interprets page description language (PDL) to generate a display list. The display list describes an object to be printed for each page of drawing data.

The reverse path length obtainer 333 obtains a reverse path length Lg of the print engine 26 through the engine controller 31 under control of the main controller 30. The reverse path length Lg is a length of path in which paper P travels in the print engine 26 to complete image formation for one page of drawing data, specifically, from the time when image formation on the front-side transfer area 262a of the photoconductive drum 262 starts to the time when image formation on the back-side transfer area 262b of the photoconductive drum 262 ends. More specifically, referring back to FIG. 2, the reverse path length Lg is a length of path in which paper P travels from the time when a part of image is formed on the front-side transfer area 262a to the time when the other part of image is formed on the back-side transfer area 262b. More specifically, referring back to FIG. 2, the reverse path length Lg is a length of path in which paper P travels from a location at which the front-side transfer area 262a of the photoconductive drum 262 is disposed, through the turn bars 264a and 264b and the reverse rollers 264c, 264d, and 264e, and back to the location at which the back-side transfer area 262b of the photoconductive drum 262 is disposed. The reverse path length Lg is previously stored in a memory managed by the print engine 26 as information specific to the print engine 26. In operation, the engine controller 31 obtains the reverse path length Lg from the memory of the print engine 26, and inputs the obtained information to the image processor 33 under control of the main controller 30. The reverse path length Lg may be expressed in cm or inch, a number of clocks of CPU 10, a number of pulses for driving a motor, etc.

The page allocator 334 obtains information regarding the image data of each page from the PDL analyzer 332, and the reverse length path Lg from the reverse path length obtainer 333. Using the obtained information, the page allocator 334 allocates front-side image data and back-side image data to specific parts of a drawing area of drawing data to generate page allocation information.

The raster converter 335 generates drawing data based on information regarding the image data obtained by the PDL analyzer 332 and the page allocation information generated by the page allocator 334. In this example, the drawing data is generated in the form of raster data, which is to be referred to by the optical writing unit 261 for irradiating light onto the surface of the photoconductive drum 262. The raster data, which may be bit-map data, is stored in a page memory of the RAM 11.

As described above, the reverse path length obtainer 334 of the image processor 33 obtains the reverse path length Lg through the engine controller 31. Based on the reverse path length Lg, the page allocator 334 allocates front-side image data and back-side image data to specific parts of a drawing area to generate page allocation information. The raster converter 335 creates drawing data based on front-side and back-side image data for each page of image data, using the page allocation information.

Figure 6:
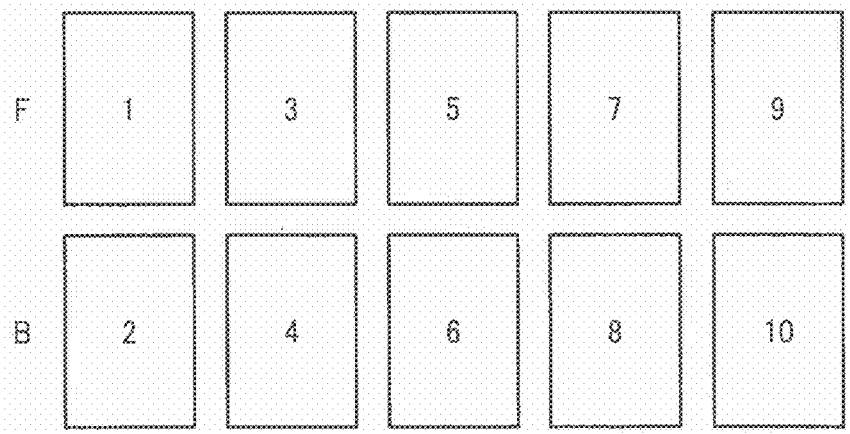
FIG. 6 is an illustration for explaining image data to be processed by the image forming apparatus of FIG. 1, according to an example embodiment of the present invention.

Referring now to FIGS. 6 to 7, page allocation performed by the page allocator 334 is explained according to an example embodiment of the present invention. FIG. 6 illustrates a plurality of pages of image data to be output. Referring to FIG. 6, the total of 10 pages are output. Further, the pages with odd numbers are printed onto the front side Ps of paper P ("F"), and the pages with even numbers are printed onto the back side Pr of paper P ("B").

FIG. 7 illustrates one example of page allocation of image data of FIG. 6. Referring to FIG. 7, D indicates a direction in which the photoconductive drum 262 rotates. The page allocator 334 arranges all odd pages of image data and all even pages of image data, respectively, in the sub-scanning direction or the direction D, in a manner the odd pages and the even pages are arranged side by side in the main scanning direction. When arranging the odd pages and the even pages side by side, the page allocator 334 considers a space in the main scanning direction between the path in which the paper P is conveyed while the front-side Ps faces toward the image forming unit 260 and the path in which the paper P is conveyed while the back-side Pr faces toward the image forming unit 260. More specifically, such space is determined based on the position of the front-side Ps of paper P relative to the front-side transfer area 262a and the position of the back-side Pr of paper P relative to the back-side transfer area 262b.

The page allocator 334 further arranges the even pages and the odd pages such that the first odd page is arranged in a distance away in the sub-scanning direction from the first even page by the reverse path length Lg. In this example illustrated in FIG. 7, the reverse length path Lg is assumed to be equal to 2.3 pages of image data of FIG. 6. Accordingly, the first even page "2" is arranged in a distance away in the sub-scanning direction from the first odd page "1" by 2.3 pages. Based on page allocation illustrated in FIG. 7, which is generated by the page allocator 334, the raster converter 335 generates drawing data for each page of image data of FIG. 6.

Referring now to FIG. 8, operation of generating drawing data for each page based on page allocation of FIG. 7 is explained according to an example embodiment of the present invention.

More specifically, in FIG. 8, the raster converter 335 generates drawing data to be printed onto one page, based on page allocation of FIG. 7. The dashed line indicates drawing data to be printed onto one page.

The raster converter 335 generates first page drawing data P1 to be printed as a first page, based on the first page "1" of image data. The raster converter 335 generates second page drawing data P2 to be printed as a second page, based on the third page "3" of image data.

Since the reverse path length Lg is equal to 2.3 pages of image data, the first even page "2" is arranged in the middle of the fifth page "5" of image data in the sub-scanning direction. More specifically, a part of the fifth page "5" of image data overlaps with the second page "2" of image data in the main scanning direction, or a part of the fifth page "5" of image data is arranged side by side to the second page "2" of image data in the main scanning direction. In such case, the raster converter 335 divides the fifth page "5" of image data into a part that is not overlapped with the second page "2" of image data, and a part that is overlapped with the second page "2" of image data. The raster converter 335 generates third page drawing data P3 to be printed as a third page, based on the part of the fifth page "5" that is not overlapped. The raster converter 335 generates fourth page drawing data P4 to be printed as a fourth page, based on the part of the fifth page "5" that is overlapped with the second page "2" and a part of the second page "2" that is overlapped with the fifth page "5". In this example, the part of the fifth page "5" that is overlapped with the second page "2" is arranged at one side that corresponds to the front-side transfer area 262a, and the part of the second page "2" that is overlapped with the fifth page "5" is arranged at the other side that corresponds to the back-side transfer area 262b.

As described above, the raster converter 335 divides the second page "2" of image data at a position that corresponds to the end of the fifth page "5". In this manner, the end of page, or division of image data, is determined based on the end of the odd page to be printed onto the front side Ps of paper P.

For the seventh page "7" and the ninth page "9" of image data, all parts of odd pages of image data are overlapped with the corresponding even pages of image data. For the seventh page "7" and the ninth page "9", the raster converter 335 divides the corresponding even pages of image data based on the end of odd page.

Referring to FIG. 8, the raster converter 335 generates fifth page drawing data P5 to be printed as a fifth page, based on the seventh page "7", a part of the second page "2" that is overlapped with the seventh page "7" in the main scanning direction, and a part of the fourth page "4" that is overlapped with the seventh page "7" in the main scanning direction.

The raster converter 335 generates sixth page drawing data P6 to be printed as a sixth page, based on the ninth page "9", a part of the fourth page "4" that is overlapped with the ninth page "9" in the main scanning direction, and a part of the sixth page "6" that is overlapped with the ninth page "9" in the main scanning direction.

Since the ninth page "9" is the last odd page of image data to be printed on the front side Ps, seventh page drawing data P7 is generated based on the remaining even pages of image data.

The raster converter 335 generates seventh page drawing data P7 to be printed as a seventh page, based on a part of the sixth page "6" that is not included in the sixth page drawing data P6.

The raster converter 335 generates eighth page drawing data P8 to be printed as an eighth page, based on the eighth page "8" of image data.

The raster converter 335 generates ninth page drawing data P9 to be printed as an ninth page, based on the tenth page "10" of image data.

As described above referring to FIG. 8, the raster converter 335 generates the total of nine page drawing data P1 to P9, each specified by the dashed line. For fourth to sixth page drawing data P4, P5, and P6, the page drawing data contains front-side image data and back-side image data. For first to third and seventh to ninth page drawing data P1, P2, P3, P7, P8, and P9, the page drawing data contains either front-side image data or back-side image data.

When outputting the first to third and seventh to ninth page drawing data P1, P2, P3, P7, P8, and P9 for storage into the page memory, information regarding the location to which the image data is to be formed is needed. More specifically, for the first to third page drawing data P1, P2, and P3, the raster converter 335 stores the page drawing data with information indicating that the front-side image data is to be formed on the side that corresponds to the front-side transfer area 262a. For the seventh to ninth page drawing data P7, P8, and P9, the raster converter 335 stores the page drawing data with information indicating that the back-side image data is to be formed on the side that corresponds to the back-side transfer area 262b.

Alternatively, the raster converter 335 may set a drawing area of page drawing data to an area that includes an area where the front-side image data is drawn and an area where the back-side image data is drawn. For example, referring back to FIG. 8, in case of generating the first page drawing data P1, the raster converter 335 assumes that the first page "1" of image data is drawn on the side that corresponds to the front-side transfer area 262a, and a black image is drawn on the side that corresponds to the back-side transfer area 262b. In case of generating the first to third and seventh to ninth page drawing data P1, P2, P3, P7, P8, and P9, information regarding the location to which the image data is to be formed is not necessary. This suppresses the amount of information to be processed, thus reducing the work load of the image forming apparatus 1.

Figure 9:
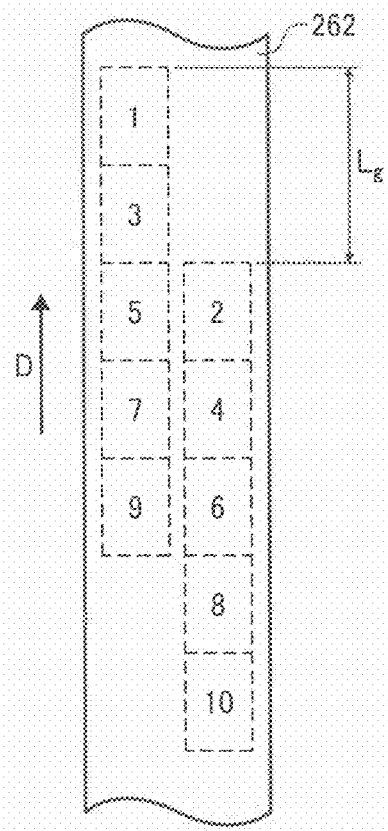
FIG. 9 is an illustration for explaining page allocation of the image data of FIG. 6, performed by the image forming apparatus of FIG. 1, according to an example embodiment of the present invention.

Referring now to FIG. 6 and FIG. 9, page allocation performed by the page allocator 334 is explained according to an example embodiment of the present invention. In this example, it is assumed that the reverse path length Lg is any value that is obtained by multiplying a page length of image data in the sub-scanning direction with any integer. Specifically, in the example illustrated in FIG. 9, the reverse path length Lg is equal to the twice of the page length of image data. As illustrated in FIG. 9, when the reverse path length Lg is equal to the twice of the page length, the first even page "2" of image data is arranged with the fifth page "5" of image data, side by side, in the sub-scanning direction such that the edges of both pages are aligned.

Figure 10:
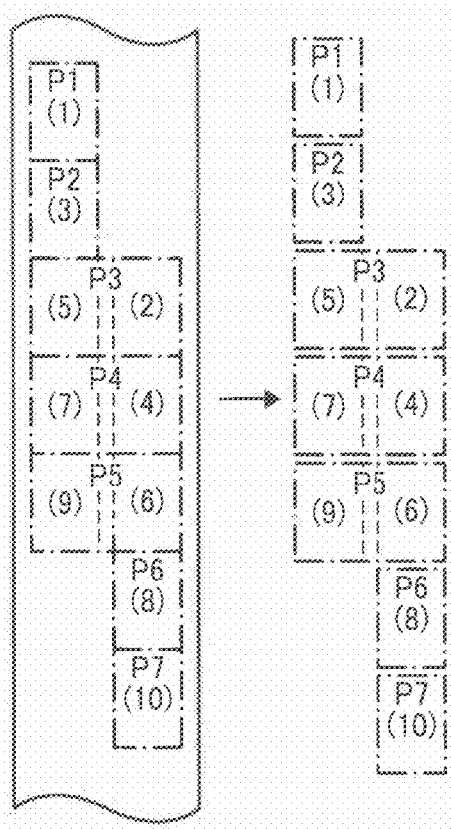
FIG. 10 is an illustration for explaining operation of generating drawing data based on the page allocation of FIG. 9, performed by the image forming apparatus of FIG. 1, according to an example embodiment of the present invention.

FIG. 10 illustrates operation of generating drawing data for each page based on page allocation of FIG. 9, performed by the raster converter 335, according to an example embodiment of the present invention.

The raster converter 335 generates first page drawing data P1 to be printed as a first page, based on the first page "1" of image data. The raster converter 335 generates second page drawing data P2 to be printed as a second page, based on the third page "3" of image data.

The raster converter 335 determines the end of page, or division of image data, based on the end of the odd page to be printed onto the front side Ps of paper P. However, since the even pages are arranged with the odd pages in a manner that the edges of the even and odd pages are aligned, the end of page is the same as the end of page for both of odd and even pages.

The raster converter 335 generates third page drawing data P3 to be printed as a third page, based on the fifth page "5" of image data and the second page "2" of image data. The raster converter 335 generates fourth page drawing data P4 to be printed as a fourth page, based on the seventh page "7" of image data and the fourth page "4" of image data. The raster converter 335 generates fifth page drawing data P5 to be printed as a fifth page, based on the ninth page "9" of image data and the sixth page "6" of image data.

The raster converter 335 generates sixth page drawing data P6 to be printed as a sixth page, based on the eighth page "8" of image data. The raster 335 generates seventh page drawing data P7 to be printed as a seventh page, based on the tenth page "10" of image data.

When outputting the first, second, sixth, and seventh page drawing data P1, P2, P6, and P7 for storage into the page memory, the raster converter 335 stores the page drawing data with information regarding the location to which the image data is to be formed in a substantially similar manner as described above referring to FIG. 8. Alternatively, the raster converter 335 may define a drawing area to include a side that corresponds to the front-side transfer area 262a and a side that corresponds to the back-side transfer area 262b, as described above referring to FIG. 8.

Figure 11:
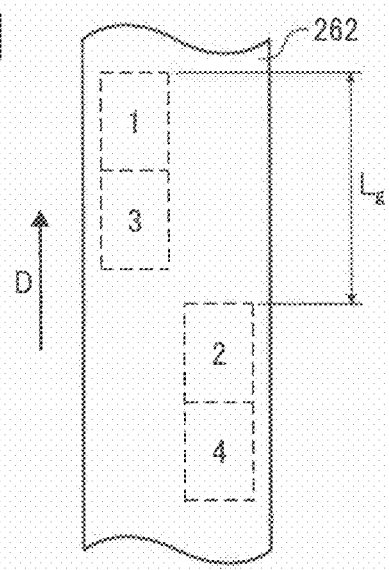
FIG. 11 is an illustration for explaining page allocation of image data, performed by the image forming apparatus of FIG. 1, according to an example embodiment of the present invention.

Referring now to FIG. 11, page allocation performed by the page allocator 334 is explained according to an example embodiment of the present invention. Referring to FIG. 11, a total number of pages of image data to be output is four. Further, the pages with odd numbers are printed onto the front side Ps of paper P, and the pages with even numbers are printed onto the back side Pr of paper P. Further, in this example, the reverse path length Lg is greater than twice of a page length of image data in the sub-scanning direction. More specifically, the reverse path length Lg is greater than a total page length of front-side image data in the sub-scanning direction.

In the example case illustrated in FIG. 11, the odd pages and the even pages are not overlapped in the main scanning direction. Accordingly, the image forming unit 260 is not instructed to form an image based on drawing image data that is generated based on front-side image data and back-side image data.

Figure 12:
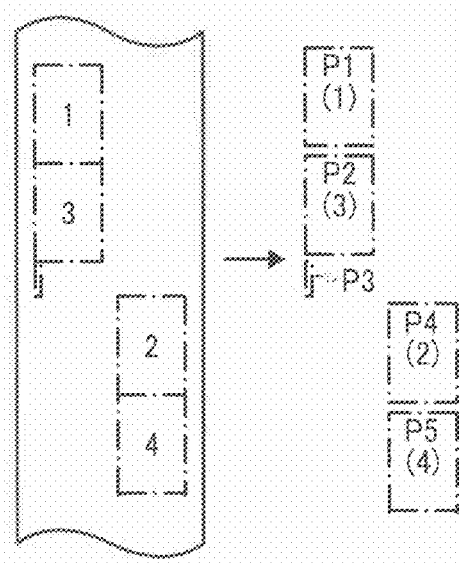
FIG. 12 is an illustration for explaining operation of generating drawing data based on the page allocation of FIG. 11, performed by the image forming apparatus of FIG. 1, according to an example embodiment of the present invention.

FIG. 12 illustrates operation of generating page drawing data for each page of image data, performed by the raster converter 335, based on page allocation of FIG. 11.

The raster converter 335 generates first page drawing data P1 based on the first page "1" of image data, and second page drawing data P2 based on the third page "3" of image data.

In this example, none of the odd pages and even pages are overlapped in the main scanning direction. Further, the edge of the last odd page is separated away from the edge of the first even page by a small amount. In image forming operation, the print engine 26 controls the position of an image to be formed onto the surface of photoconductor 262, using the leading edge of first page drawing data and the length of succeeding page drawing data in the sub-scanning direction, based on assumption that data is always present in the sub-scanning direction after detection of the leading edge of first page drawing data. For this reason, in case when there is a blank between the trailing edge of the last odd page and the leading edge of the first even page as illustrated in FIG. 11, the raster converter 355 generates third page drawing data P3 based on blank image data. As data is needed only for the sub-scanning direction, third page drawing data P3 is generated based on one line of blank image data. In this manner, the amount of information to be processed or the memory resource is reduced.

Further, in this example, the blank image data may contain the background color that is determined based on the color of paper P, such as white.

The raster converter 335 generates fourth page drawing data P4 based on the second page "2" of image data, and fifth page drawing data P5 based on the fourth page "4" of image data.

When outputting the first, second, fourth, and fifth page drawing data P1, P2, P4, and P5 for storage into the page memory, the raster converter 335 stores the page drawing data with information regarding the location to which the image data is to be formed.

Figure 13:
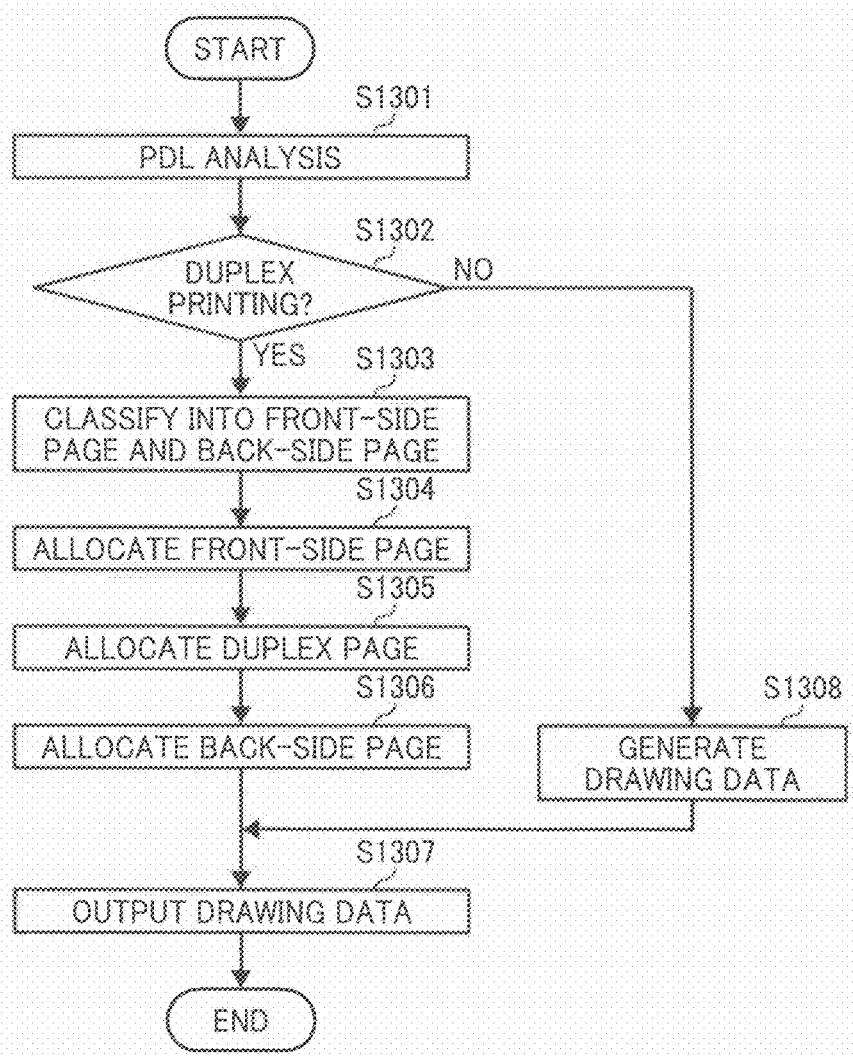
FIG. 13 is a flowchart illustrating operation of generating drawing data, performed by the image forming apparatus of FIG. 1, according to an example embodiment of the present invention.

Referring now to FIG. 13, operation of generating drawing data, performed by the image processor 33, is explained according to an example embodiment of the present invention. The operation of FIG. 13 is performed by the image processor 33 when the image processor 33 is input with print job.

At S1301, the print job obtainer 331 receives the print job, and obtains print data that is written in PDL from the print job under control of the main controller 30. The PDL analyzer 331 analyzes the print data to generate a display list. The display list generated by the PDL analyzer 331 is input to the page allocator 332.

At S1302, the page allocator 332 determines whether the print job instructs to perform duplex printing based on a printing instruction specified by the print job. When it is determined that duplex printing is to be performed ("YES" at S1302), the operation proceeds to S1303. When it is determined that duplex printing is not to be performed ("NO" at S1302), the operation proceeds to S1308.

At S1303, the page allocator 332 allocates pages of image data into front-side image data to be printed onto the front side Ps of paper P, and back-side image data to be printed onto the back side Pr of paper P, based on the display list.

More specifically, at S1303, the page allocator 332 classifies pages of image data into pages to be printed onto the front side Ps of paper P, and pages to be printed onto the back side Pr of paper P, as illustrated in FIG. 6. In the example illustrated in FIG. 6, 10 pages of image data are allocated into the odd pages to be printed onto the front side Ps of paper P, and the even pages to be printed onto the back side Pr of paper P.

At S1304, the page allocator 332 and the raster converter 335 perform allocation of pages of front-side image data to generate drawing data based on the front-side image data for each page of image data that are subjected for processing described below referring to FIG. 14.

At S1305, the page allocator 332 and the raster converter 335 perform allocation of pages of front-side image data and pages of back-side image data to generate drawing data based on the front-side image data and the back-side image data for each page of image data that are subjected for processing described below referring to FIG. 15.

At S1306, the page allocator 332 and the raster converter 335 perform allocation of pages of back-side image data to generate drawing data based on the back-side image data for each page of image data that are subjected for processing described below referring to FIG. 16.

At S1307, the raster converter 335 outputs the drawing data for storage into the page memory, and the operation ends. The drawing data for output includes all pages of the drawing data generated at S1304, S1305, and S1306.

At S1302, when it is determined that duplex printing is not to be performed ("NO" at S1302), the operation proceeds to S1308. At S1308, the raster converter 335 converts image data of each page generated based on the display list to drawing data. At S1307, the raster converter 335 outputs the drawing data for storage in the page memory, and the operation ends.

Figure 14:
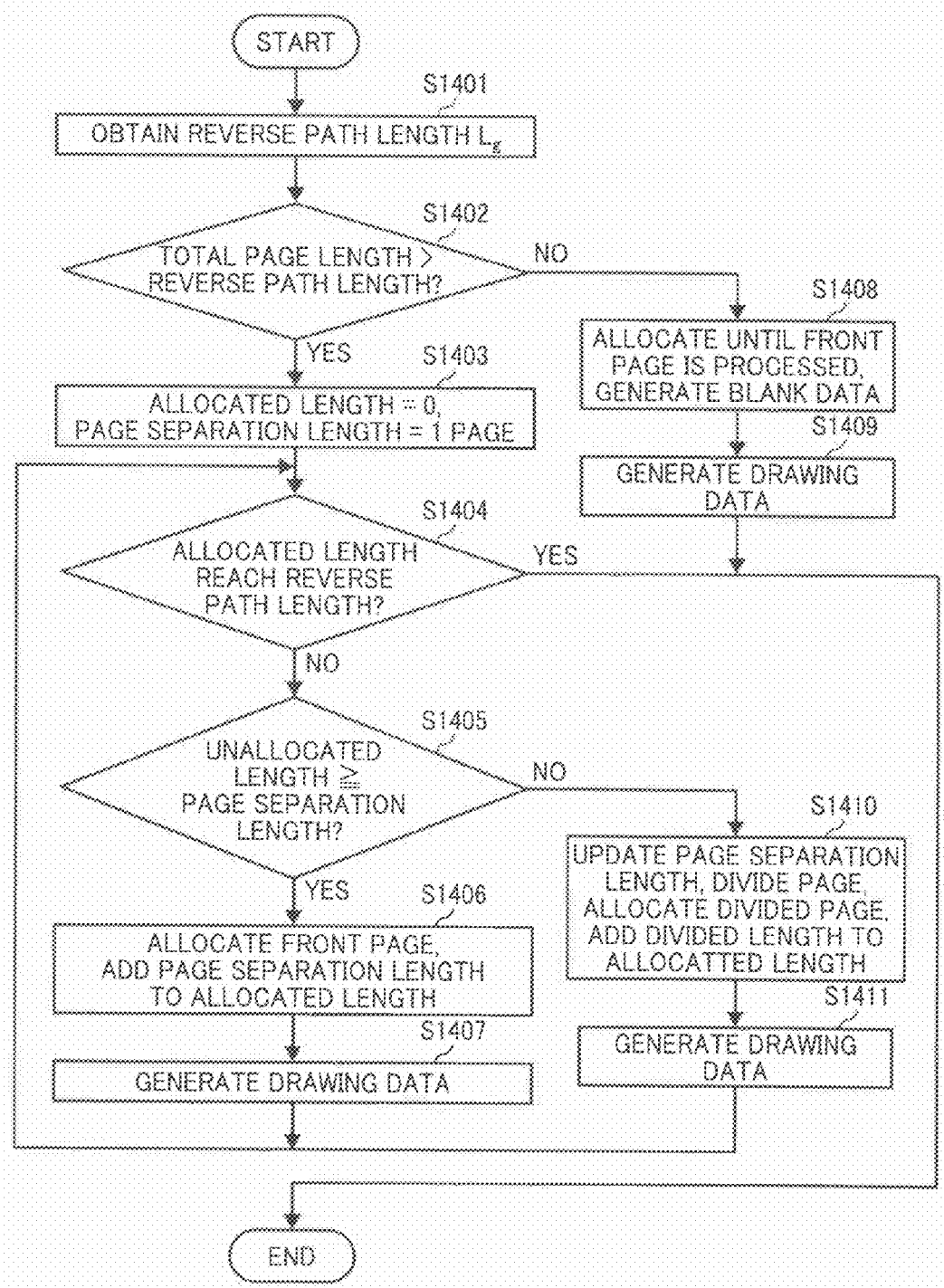
FIG. 14 is a flowchart illustrating operation of allocating front-side image data to generate drawing data based on front-side image data, performed by the image forming apparatus of FIG. 1, according to an example embodiment of the present invention.

Referring now to FIG. 14, operation of allocating pages of front-side image data to generate drawing data based on front-side image data is explained according to an example embodiment of the present invention.

At S1401, the reverse path length obtainer 333 obtains the reverse path length Lg through the engine controller 31, and inputs the obtained reverse path length Lg to the page allocator 334.

At S1402, the page allocator 334 compares a total page length of front-side image data with the reverse path length Lg. The total page length is a sum of lengths of all pages of front-side image data in the main scanning direction, which are to be printed onto the front side Ps of paper P. The total page length is obtainable from the display list. In the example illustrated in FIG. 7, the total page length of front-side image data is a sum of lengths of all odd pages of 1, 3, 5, 7, and 9 of front-side image data in the main scanning direction. The comparison result of S1402 is used to determine whether the front-side image data and the back-side image data are partially overlapped with each other in the sub-scanning direction as illustrated in FIG. 7 or 9, or the front-side image data and the back-side image data are not overlapped with each other in the sub-scanning direction as illustrated in FIG. 11. More specifically, in this example, the page allocator 234 determines whether the total page length is greater than the reverse path length Lg.

When the comparison result of S1402 indicates that the total page length is less than the reverse path length Lg ("NO" at S1402), the operation proceeds to S1408. At S1408, the page allocator 344 allocates pages as described above referring to FIG. 11. The page allocator 334 allocates the pages of front-side image data, page by page, until all pages of front-side image data are processed, and outputs information regarding the page allocation to the raster converter 335. The information regarding the page allocation may be output in the form of display list. The page allocator 234 further generates blank image data such as the blank image data to be included in the third page drawing data P3 of FIG. 12, which has a predetermined length in the sub-scanning direction. The length of blank image data is a value obtained by subtracting the reverse path length Lg from the total page length.

At S1409, the raster converter 335 obtains the page allocation information from the page allocator 234, and generates drawing data based on the obtained information. The raster converter 335 further obtains the blank image data from the page allocator 234, and generates drawing data based on the blank image data.

At S1402, when it is determined that the total page length is greater than the reverse path length Lg ("YES" at S1402), the operation proceeds to S1403. At S1403, the page allocator 344 allocates pages of front-side image data as described above referring to FIG. 7 or 9.

At S1403, the page allocator 334 sets an internal parameter of the page allocator 334 to a predetermined value. In this example, the parameter includes an allocated length parameter and a page separation length parameter. The page allocator 334 sets the allocated length parameter to 0, and the page separation length parameter to one page.

In this example, the allocated length parameter specifies a sub-scanning direction length of front-side image data that has been allocated into page drawing data by the page allocator 334. In this example, information regarding the front-side image data is obtained from the display list generated by the PDL analyzer 331. The page allocator 334 compares the allocated length parameter value with the reverse path length Lg to determine whether page allocation of front-side image data to be processed at S1304 is completed. The page separation length parameter specifies a sub-scanning direction length of front-side image data to be included in one page of page drawing data. For example, referring to FIG. 8, the page separation length parameter specifies a length of page drawing data P1 in the sub-scanning direction.

At S1404, the page allocator 334 compares the allocated length parameter value with the reverse path length Lg to determine whether page allocation of front-side image data is completed for drawing data to be generated at S1304. When it is determined that the allocated length parameter value reaches the reverse path length Lg ("YES" at S1404), the operation ends to proceed to S1305. When it is determined that the allocated length parameter value does not reach the reverse path length Lg ("NO" at S1404), the operation proceeds to S1405.

At S1405, the page allocator 334 obtains the length of front-side image data that is not allocated ("unallocated length") by subtracting the reverse path length Lg from the allocated length value. The page allocator 334 further determines whether the unallocated length is equal to or greater than the page separation length. When it is determined that the unallocated length is equal to or greater than the page separation length ("YES" at S1405), the operation proceeds to S1406.

At S1406, the page allocator 334 obtains the front-side image data of one page using the display list, and inputs the obtained front-side image data to the raster converter 335. The page allocator 334 further updates the value of the allocated length parameter by adding the page separation length value.

At S1407, the raster converter 335 obtains the page allocation information from the page allocator 334, for example, in the form of display list. The raster converter 335 generates the drawing data based on the page allocation information, and the operation returns to S1404.

For example, in the example illustrated in FIG. 7, S1406 and S1407 are performed for the first odd page "1" and the second odd page "3" of front-side image data to generate first page drawing data P1 based on the first odd page "1" and second page drawing data P2 based on the second odd page "3" of FIG. 8.

At S1405, when it is determined that the unallocated length is less than the page separation length ("NO" at S1405), the operation proceeds to S1410.

At S1410, the page allocator 334 updates the page separation length parameter with the unallocated length, and divides the unprocessed front-side image data into a part having the updated page separation length and the remaining part. The page allocator 334 inputs the part of the front-side image data having the updated page separation length to the raster converter 335. The page allocator 334 further updates the value of the allocated length parameter by adding the updated page separation length value.

At S1411, the raster converter 335 obtains the page allocation information from the page allocator 334, for example, in the form of display list. The raster converter 335 generates the drawing data based on the page allocation information, and the operation returns to S1404.

For example, referring to FIG. 8, the page allocator 334 determines that the unallocated length is less than the page separation length for the third odd page "5" of image data, after the page allocator 334 outputs the image data of the second odd page "3" to the raster converter. At S1410, the page allocator 334 outputs a part of the third odd page "5" to the raster converter 335 in the form of display list. At S1411, the raster converter 335 generates third page drawing image data P3 based on the part of third odd page "5" as illustrated in FIG. 8.

In such case, at S1404, the page allocator 334 determines that the allocated length is equal to the reverse path length Lg ("NO" at S1404), since the allocated length is updated by adding the length of the part that is divided from the unallocated front-side image data. The operation ends to proceed to S1305.

In the example case illustrated in FIG. 9, in which the reverse path length Lg is a multiplied value of a page length of image data in the sub-scanning direction, S1410 and S1411 are not performed. In such case, S1406 and S1407 are repeated to generate drawing data of FIG. 10.

Figure 15:
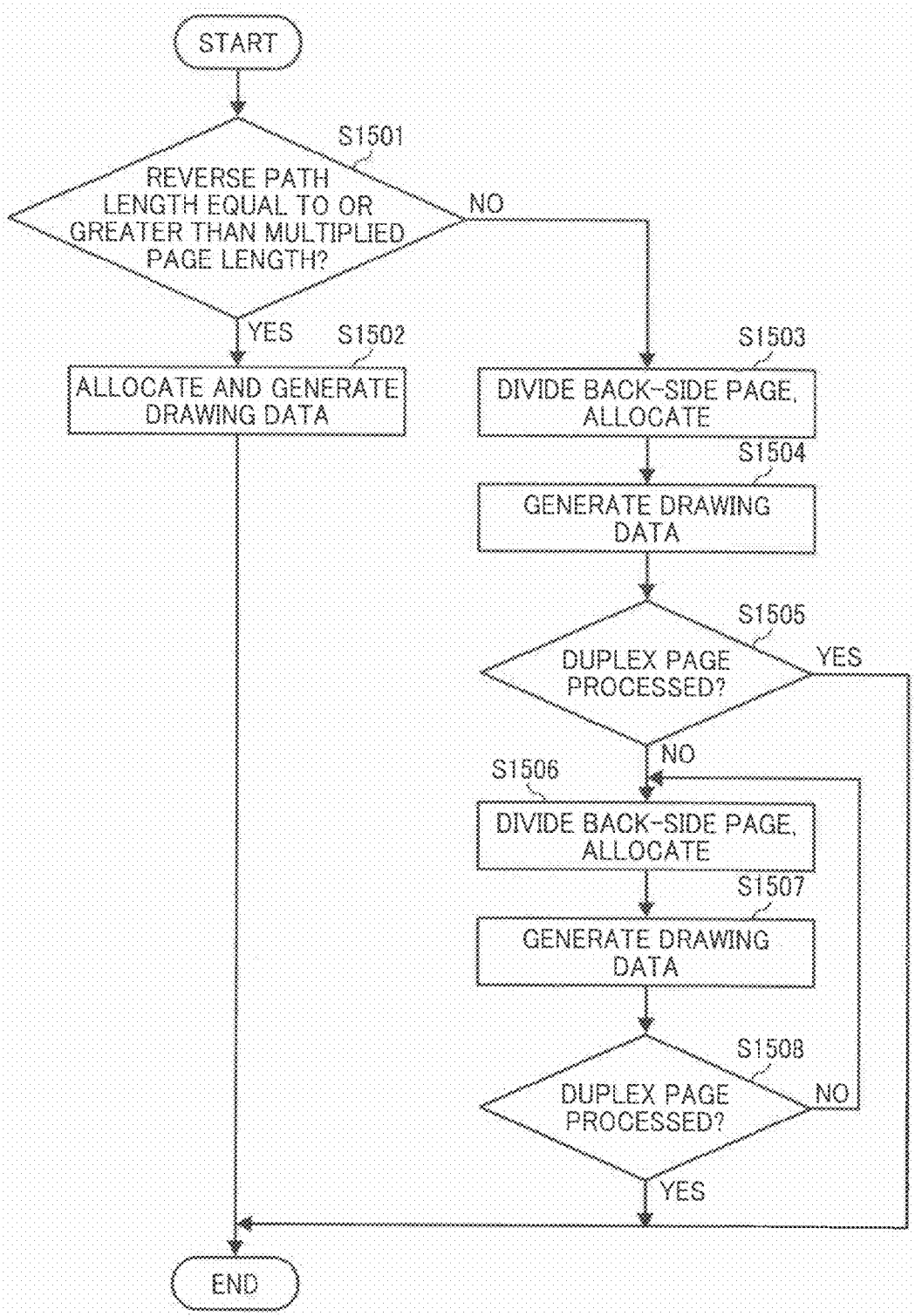
FIG. 15 is a flowchart illustrating operation of allocating front-side image data and back-side image data to generate drawing data based on front-side image data and back-side image data, performed by the image forming apparatus of FIG. 1, according to an example embodiment of the present invention.

Referring now to FIG. 15, operation of allocating pages of front-side image data and pages of back-side image data to generate drawing data based on front-side image data and back-side image data is explained, according to an example embodiment of the present invention.

At S1501, the page allocator 334 determines whether the reverse path length Lg is equal to or greater than a multiplied value of the page length of image data in the sub-scanning direction. In this example, the multiplied value of the page length of image data is any number obtained by multiplying the page length of image data with an integer.

When it is determined that the reverse path length Lg is equal to or greater than the multiplied page length ("YES" at S1501), the operation proceeds to S1502.

At S1502, the page allocator 334 refers to the display list to allocate each page of front-side image data with corresponding page of back-side image data to generate page allocation information, until all pages or parts of front-side image data and back-side image data that are subjected for processing at S1305 are processed. In this example, a part of image data subjected for processing is determined based on a length obtained by subtracting the reverse path length Lg from the total page length of image data in the sub-scanning direction.

The raster converter 335 obtains the allocation information from the page allocator 334 in the form of display list, and generates drawing data based on the allocation information.

For example, as described above referring to FIGS. 9 and 10, the page allocator 334 generates a display list of image data, in which pages of front-side image data and pages of back-side image data are arranged, side by side, in the main-scanning direction such that the edges of both pages are aligned. The raster converter 335 generates drawing data based on the display list generated by the page allocator 334.

When it is determined that the reverse path length Lg is not equal to or greater than the multiplied page length ("NO" at S1501), the operation proceeds to S1503.

At S1503, the page allocator 334 performs page allocation in a substantially similar manner as described above referring to FIG. 7. The page allocator 334 refers to the page separation length parameter value, which is updated at S1410 of FIG. 14, to obtain a first length by subtracting the updated page separation length from the original page separation length. The original page separation length is a page length value. The page allocator 334 divides the first page of back-side image data into a part having the first length, and the remaining part having a second length that is obtained by subtracting the first length from the page length value. The page allocator 334 further allocates the remaining unallocated part of the front-side image data, which is obtained at S1410, and the first part of the back-side image data into one page drawing data, to generate page allocation information. The page allocator 334 outputs the page allocation information to the raster converter 335 in the form of display list. The display list describes drawing data in which a part of front-side image data and a part of back-side image data are arranged at specific sides of a drawing area, for example, as illustrated in fourth page drawing data P4 of FIG. 8.

At S1504, the raster converter 335 generates drawing data based on the display list obtained from the page allocator 334.

At S1505, the page allocator 334 determines whether page allocation is completed for all pages or parts of front-side image data and back-side image data subjected for processing at S1305. When it is determined that page allocation for front-side image data and back-side image data to be output as drawing image data is completed ("YES" at S1505), the operation ends to proceed to S1306.

When it is determined that page allocation for front-side image data and back-side image data to be output as drawing image data is not completed ("NO" at S1505), the operation proceeds to S1506.

At S1506, the page allocator 334 refers to the page separation length parameter value, which is updated at S1410 of FIG. 14, to obtain a first length by subtracting the updated page separation length from the page length value. The page allocator 334 divides the second page of back-side image data into a part having the first length, and the remaining part having a second length that is obtained by subtracting the first length from the page length value.

The page allocator 334 allocates unprocessed page of the front-side image data, the remaining unallocated part of the first page of the back-side image data, and the first part of the second page of the back-side image data, into one page drawing data, to generate page allocation information. The page allocator 334 outputs the page allocation information to the raster converter 335 in the form of display list. The display list describes drawing data in which a part of front-side image data and a part of back-side image data are arranged at specific sides of a drawing area, for example, as illustrated in fifth page drawing data P5 or sixth page drawing data P6 of FIG. 8.

At S1507, the raster converter 335 generates drawing data based on the display list obtained from the page allocator 334.

At S1508, the page allocator 334 determines whether page allocation is completed for all pages or parts of front-side image data and back-side image data subjected for processing at S1305. When it is determined that page allocation for front-side image data and back-side image data to be output as drawing image data is completed ("YES" at S1508), the operation ends to proceed to S1306. When it is determined that page allocation for front-side image data and back-side image data to be output as drawing image data is not completed ("NO" at S1508), the operation returns to S1506.

Figure 16:
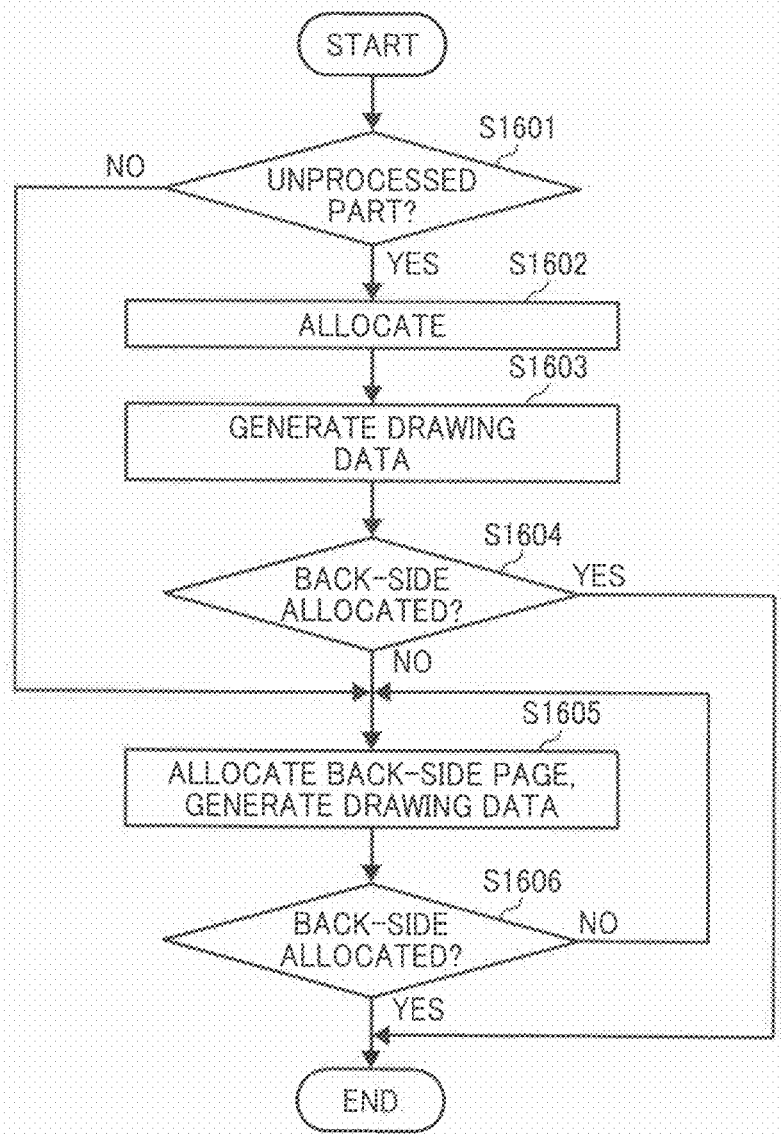
FIG. 16 is a flowchart illustrating operation of allocating back-side image data to generate drawing data based on back-side image data, performed by the image forming apparatus of FIG. 1, according to an example embodiment of the present invention.

Referring now to FIG. 16, operation of page allocation of back-side image data to generate drawing data based on back-side image data is explained, according to an example embodiment of the present invention.

At S1601, the page allocator 334 determines whether there is any unprocessed pages or part of back-side image data, which is necessary for page allocation. At S1601, the page allocator 334 determines that page allocation by the page allocator 334 is necessary when there is the remaining unprocessed part of the back-side image data, which is divided at S1305. For example, the page allocator 334 determines that the unprocessed page or part of back-side image data exists in the example illustrated in FIG. 7. The page allocator 334 determines that the unprocessed page or part of back-side image data does not exit in the example illustrated in FIGS. 9 and 11.

When it is determined that the unprocessed pages or part of back-side image data exists ("YES" at S1601), the operation proceeds to S1602.

At S1602, the page allocator 334 obtains the remaining unprocessed part of back-side image data from the display list, and outputs information regarding the remaining unprocessed part of back-side image data to the raster converter 335.

At S1603, the raster converter 335 generates drawing data based on the display list regarding the remaining the remaining unprocessed part of back-side image data. For example, referring to FIG. 8, the raster converter 335 generates seventh drawing data P7 based on the remaining unprocessed part of the sixth page of back-side image data.

At S1604, the page allocator 334 determines whether all pages or parts of back-side image data are allocated. When it is determined that all pages or parts of back-side image data are allocated ("YES" at S1604), the operation ends. When it is determined that all pages or parts of back-side image data are not allocated ("NO" at S1604), the operation proceeds to S1605.

At S1605, the page allocator 334 refers to the display list to allocate the remaining pages of the back-side image data using the original page separation length, and outputs the page allocation information to the raster converter 335. The raster converter 335 generates drawing data based on the display list obtained from the page allocator 334.

At S1601, when it is determined there is no remaining unprocessed parts or pages of back-side image data ("NO" at S1601), the operation proceeds to S1605.

In the example illustrated in FIG. 11, the page allocator 334 generates a display list for blank image data. The raster converter 335 generates page drawing data based on the blank image data using the display list obtained from the page allocator 334.

At S1606, the page allocator 334 determines whether all parts or pages of back-side image data are allocated. When it is determined that all parts or pages of back-side image data are allocated ("YES" at S1606), the operation ends to proceed to S1307. When it is determined that all parts or pages of back-side image data are not allocated ("NO" at S1606), the operation returns to S1605.

As described above, the image forming apparatus 1 forms images on both sides of continuous roll paper using SED method. The surface of the image forming unit 260 is divided into a part for forming an image to be formed on the front side of paper, and a part for forming an image to be formed on the back side of paper. The image processor 33 generates drawing data based on front-side image data and back-side image data, using information regarding the dividing structure of the image forming unit 260 and a passage of continuous roll paper. Since the drawing data includes information regarding front-side image data and back-side image data, the print engine 26 that receives the drawing data only needs to perform image formation in a substantially similar manner as the regular image forming operation.

In the above-described example, the image forming apparatus 1 performs image formation using electrophotographic method. Alternatively, any desired image forming apparatus may be implemented such as an image forming apparatus that forms an image using ink-jet method.

Further, in the above-described example, the drawing data is generated by the image processor 33 of the image forming apparatus 1. Alternatively, the operation or function of the image processor 33 may be incorporated into another apparatus that communicates with the image forming apparatus 1. More specifically, an image forming system may be provided, which includes an image processing apparatus 3 and an image forming apparatus 2 as illustrated in FIG. 17.

Figure 17:
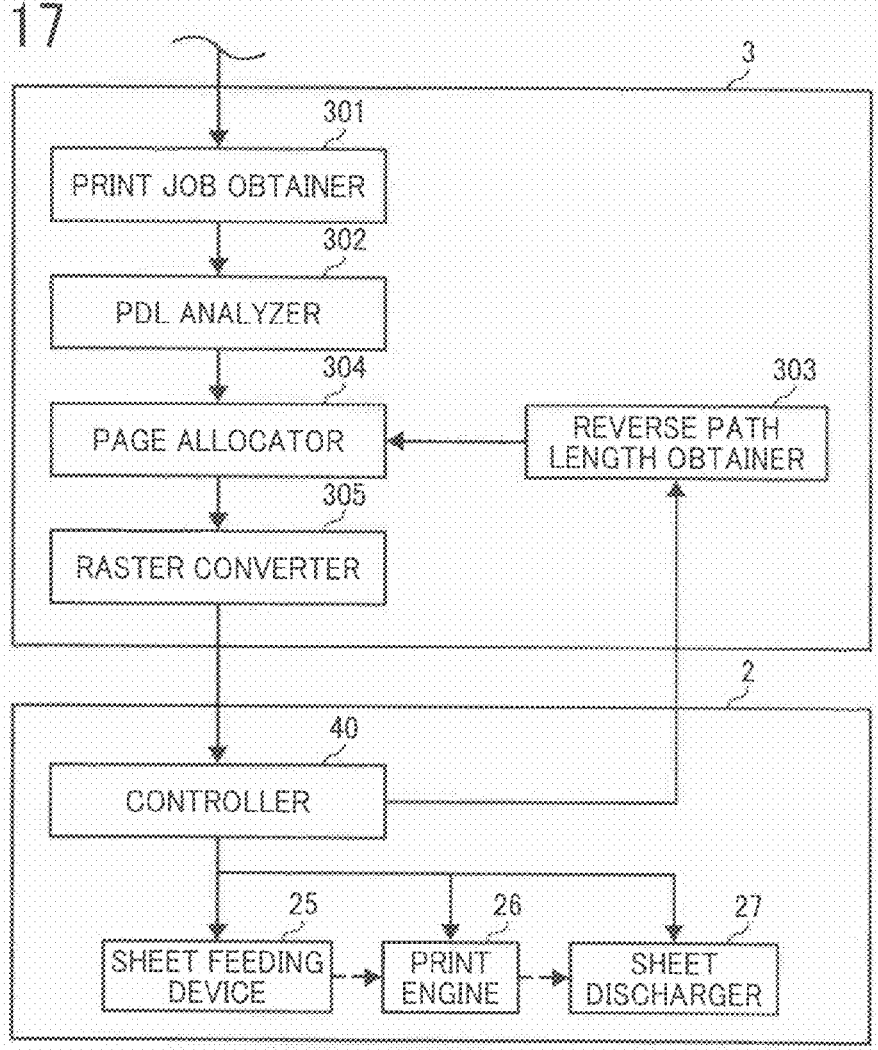
FIG. 17 is a functional structure of an image forming system according to an example embodiment of the present invention.

In FIG. 17, the image processing apparatus 3 receives a print job, and generates drawing data, such as raster data, based on the print job, for input to the image forming apparatus 2. Since the image forming apparatus 2 does not have to be upgraded to have a print engine 26 that is capable of generating drawing data as described above, the manufacturing cost is greatly reduced.

Referring to FIG. 17, the image forming apparatus 2 includes a controller 40, a sheet feeding device 25, a print engine 26, and a sheet discharger 27. The controller 40 is substantially similar in function and operation to the controller 20 of FIG. 2 except that the image processor 33 of FIG. 2 is not provided. The image processing apparatus 3 functions as the image processor 33 of FIG. 5 such that it includes a print job obtainer 301, a PDL analyzer 302, a reverse path length obtainer 303, a page allocator 304, and a raster converter 305. The image processing apparatus 3 is connected to the image forming apparatus 2 through a network.

In operation, the image processing apparatus 3 receives a print job from an information processing apparatus through the network, and generates drawing data based on the print job in a substantially similar manner as described above referring to the example case of the image processor 33. The generated drawing data is input to the image forming apparatus 2.

In case of printing image data of a plurality of colors, the image processing apparatus 3 generates drawing data for each of the colors, and transfers the drawing data of each color to the image forming apparatus 2 through a transmission line provided for each color of drawing data. Accordingly, the image processing apparatus 3 and the image forming apparatus 2 are connected through a plurality of transmission lines.

Alternatively, the image forming apparatus 2 may send the drawing data to the image forming apparatus 3 through a single transmission line. In such case, the transmission line is divided into a plurality of channels each corresponding to one of the plurality of colors of drawing data. The single transmission line may be connected with a serial communication interface.

Further, in this example, the image processing apparatus 3 receives information regarding the reverse path length Lg from the image forming apparatus 2. The image forming apparatus 2 may send the reverse path length information through another channel of the transmission line. In this manner, overhead in data transfer is suppressed.

As described above, the print job obtainer 301 receives a print job, and inputs the print job to the PDL analyzer 302. The PDL analyzer 302 generates a display list based on the PDL obtained from the print job, and inputs the display list to the page allocator 304.

The reverse path length obtainer 303 obtains the reverse path length Lg from the controller 40 of the image forming apparatus 2.

The page allocator 304 allocates each page of image data using information obtained from the display list to generate page allocation information.

The raster converter 335 generates drawing data based on the display list, or the page allocation information, that is generated by the page allocator 304.

In this example, the raster converter 305 outputs the drawing data to the controller 40 of the image forming apparatus 2 through the interface between the image processing apparatus 3 and the image forming apparatus 2. The controller 40 of the image forming apparatus 2 stores the drawing data in a page memory of the controller 40. The drawing data may be generated for each one of a plurality of colors of image data.

The controller 40 of the image forming apparatus 2 further controls the sheet feeding device 25, the print engine 26, and the sheet discharger 27, to complete image formation.

In the above-describe example illustrated in FIG. 17, the functions of the image processor 33 are all incorporated into the image processing apparatus 3. Alternatively, a part of the functions of the image processor 33 may be incorporated into the image processing apparatus 3. For example, the print job obtainer 301, the PDL analyzer 302, the reverse path length obtainer 303, and the page allocator 304 may be incorporated into the image processing apparatus 3, while the raster converter 305 may be incorporated into the image forming apparatus 2. In such case, the page allocator 304 allocates each page of image data to generate a display list that describes drawing data in which front-side image data and back-side image data are allocated, and send the display list to the controller 40 of the image forming apparatus 2. The controller 40 includes the raster converter 335, which generates drawing data based on the display list obtained from the page allocator 304.

Even in the example case in which a part of the controller that controls operation of the print engine is incorporated in the outside apparatus that communicates with an image forming apparatus having the print engine, there is not need to synchronize operations between the outside apparatus and the image forming apparatus.

Figure 18:
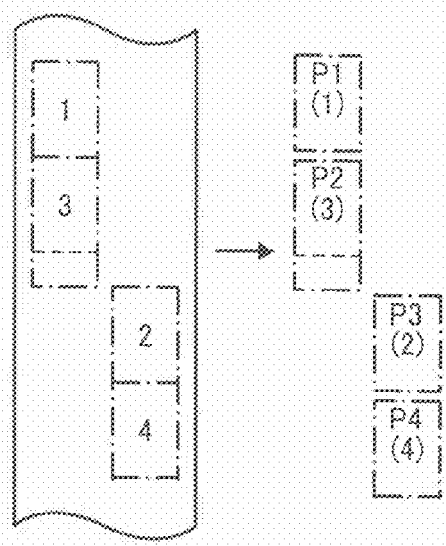
FIG. 18 is an illustration for explaining operation of generating drawing image data, performed by the image forming system of FIG. 17, according to an example embodiment of the present invention.

Further, as described above referring to FIG. 12, when the pages of front-side image data and the pages of back-side image data are separated away in the sub-scanning direction, drawing data is generated based on blank image data such as white-color image data. Alternatively, as illustrated in FIG. 18, the raster converter may extend the sub-scanning direction length of the second page drawing data P2 to include the blank image data, without generating the drawing data that only includes the blank image data. Alternatively, the raster converter may extend the sub-scanning direction length of the third page drawing data P3 of FIG. 18 to include the blank image data. In such case, the second page drawing data P2 does not include the blank image data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an apparatus for controlling an image forming apparatus that forms images on both of a front side and a back side of continuous roll paper. The image forming apparatus includes an image forming unit having an image forming area that is divided into a front-side transfer area in which a front-side image is formed and a back-side transfer area in which a back-side image is formed. The image forming apparatus transfers the front-side image from the front-side transfer area to a front side of paper, causes the paper having the front-side image formed thereon to transfer to a position that faces the back-side transfer area while the back-side of the paper faces upside, and transfers the back-side image from the back-side transfer area to the back-side of paper. The controller apparatus includes an image obtainer to obtain image data to be output, a reverse path length obtainer to obtain information regarding a reverse path length indicating a length of path in which continuous roll paper travels between the time when the front-side image is transferred and the time when the other-side image is transferred, and a page allocator to obtain information regarding the image data to be output, and allocate the front-side image and the back-side image, respectively, at positions that are parallel with each other in the main scanning direction to generate page allocation information. The page allocation information indicates that the front-side image and the back-side image are allocated to a first part and a second part of a drawing area, the first part of the drawing area corresponding to the front-side transfer area and the second part of the drawing area corresponding to the back-side transfer area, to generate page allocation information. The page allocation information further indicates that a first page of the front-side image and a first page of the back-side image are arranged at the positions away from each other by a sub-scanning direction length determined based on the reverse path length.

In another example, the controller apparatus further includes a drawing data generator to generate drawing data based on the page allocation information generated by the page allocator. The drawing data is referred to by the image forming unit for forming the images.

In another example, the drawing data generator generates page drawing data for each page of image, based on information regarding a position where each page is separated for the front-side image or the back-side image. For example, the drawing data generator generates page drawing data based on the front-side image using information regarding a position where each page of the front-side image is separated. The drawing data generator generates page drawing data based on the back-side image using information regarding a position where each page of the back-side image is separated. The drawing data generator generates page drawing data based on the front-side image and the back-side image using information regarding a position where each page of the front-side image is separated.

In another example, when the drawing data generator determines that the position where a first page of the front-side image is separated differs from a position where the corresponding first page of the back-side image is separated in the sub-scanning direction, the drawing data generator divides the first page of the back-side image into a part that is overlapped with the first page of the front-side image in the main-scanning direction and a remaining part that is not overlapped with the first page of the front-side image in the main-scanning direction. The drawing data generator further generates page drawing data based on the first page of the front-side image and the part of the first page of the back-side image.

In another example, when pages of the front-side image and pages of the back-side image are separated in the sub-scanning direction by a predetermined length, the drawing data generator generates page drawing data based on blank image data having the predetermined length in the sub-scanning direction.

In another example, when pages of the front-side image and pages of the back-side image are separated in the sub-scanning direction by a predetermined length, the drawing data generator extends a sub-scanning length of the last page of the front-side image by the predetermined length toward the first page of the back-side image to generate page drawing data including the last page of the front-side image and blank image data.

In another example, when pages of the front-side image and pages of the back-side image are separated in the sub-scanning direction by a predetermined length, the drawing data generator extends a sub-scanning length of the first page of the back-side image by the predetermined length toward the last page of the front-side image to generate page drawing data including the first page of the back-side image and blank image data.

In another example, any one of the above-described controller apparatus may be provided with the image forming unit to form the images respectively on the front and back sides of paper, and a sheet transfer device that transfers the paper with the front side of paper being faced up for formation of the front-side image and transfers the paper with the back side of paper being faced up for formation of the back-side image.

In another example, the present invention may reside in a method of controlling an image forming apparatus that forms images on both of a front side and a back side of continuous roll paper. The image forming apparatus includes an image forming unit having an image forming area that is divided into a front-side transfer area in which a front-side image is formed and a back-side transfer area in which a back-side image is formed. The image forming apparatus transfers the front-side image from the front-side transfer area to a front side of paper, causes the paper having the front-side image formed thereon to a position that faces the back-side transfer area while the back-side of the paper faces upside, transfers the back-side image from the back-side transfer area to the back-side of paper. The method of controlling includes: obtaining image data to be output; obtaining information regarding a reverse path length indicating a reverse path length of path in which continuous roll paper travels between the time when the front-side image is transferred and the time when the other-side image is transferred; and allocating the front-side image and the back-side image, respectively, at positions that are parallel with each other in the main scanning direction to generate page allocation information using information regarding the image data to be output. The page allocation information indicates that the front-side image and the back-side image are allocated to a first part and a second part of a drawing area, the first part of the drawing area corresponding to the front-side transfer area and the second part of the drawing area corresponding to the back-side transfer area, to generate page allocation information. The page allocation information further indicates that a first page of the front-side image and a first page of the back-side image are arranged at the positions away from each other by a sub-scanning direction length determined based on the reverse path length.

In another example, the present invention may reside in a recording medium storing a plurality of instructions which, when executed by a processor, cause the processor to perform the above-described controlling method.

In another example, the present invention may reside in a recording medium storing a plurality of instructions which, when executed by a processor, cause the processor to perform a method of controlling an image forming apparatus having an image forming device therein. The method includes: obtaining image data to be formed on a continuous roll sheet, the image data including front-side image data to be formed on a front side of the continuous roll sheet and back-side image data to be formed on the back side of the continuous roll sheet; obtaining information regarding a reverse path length that indicates a length of path in which the continuous roll sheet travels in the image forming device between the time at which the front-side image data is formed on the front side of the continuous roll sheet and the time at which the back-side image data is formed on the back side of the continuous roll sheet; allocating a first page of the front-side image data and a first page of the back-side image data at respective positions that are parallel with each other in the main scanning direction, wherein the position of the first page of the front-side image data and the position of the first page of the back-side image data are separated from each other in the sub-scanning direction by a length determined based on the reverse path length; and generating page allocation information that indicates to combine a part of the front-side image data and a part of the back-side image data that are overlapped with each other in the main scanning direction into drawing data.

What is claimed is:

1. An apparatus for controlling an image forming apparatus having an image forming device therein, the apparatus comprising:

an image obtainer to obtain image data to be formed on a continuous roll sheet, the image data including front-side image data to be formed on a front side of the continuous roll sheet and back-side image data to be formed on the back side of the continuous roll sheet;

a reverse path length obtainer to obtain information regarding a reverse path length that indicates a length of path in which the continuous roll sheet travels in the image forming device between the time at which the front-side image data is formed on the front side of the continuous roll sheet and the time at which the back-side image data is formed on the back side of the continuous roll sheet;

a page allocator to:
  allocate a first page of the front-side image data and a first page of the back-side image data at respective positions that are parallel with each other in the main scanning direction, wherein the position of the first page of the front-side image data and the position of the first page of the back-side image data are separated from each other in the sub-scanning direction by a length determined based on the reverse path length; and
  generate page allocation information that indicates to combine a part of the front-side image data and a part of the back-side image data that are overlapped with each other in the main scanning direction into drawing data; and a drawing data generator to generate drawing data of the image data using the page allocation information, wherein the drawing data generator is configured to
  generate drawing data that contains the front-side image data, using information regarding a position where each page of the front-side image data is separated from the preceding page;
  generate drawing data that contains the front-side image data and the back-side image data that are overlapped with each other in the main scanning direction, using information regarding a position where each page of the front-side image data is separated from the preceding page; and
  generate drawing data that contains the back-side image data using information regarding a position where each page of the back-side image data is separated from the preceding page.

2. The apparatus of claim 1, wherein
the page allocator determines to generate the page allocation information that indicates to combine a part of the front-side image data and a part of the back-side image data when a total page length of the image data is greater than the reverse path length, the total page length indicating a length of all pages of the front-side image data in the sub-scanning direction.

3. The apparatus of claim 2, wherein:
the page allocator is configured to determine whether a page of the front-side image data and a page of the back-side image data that are overlapped with each other in the main scanning direction are separated at the same positions in the main scanning direction to generate a determination result, and
when the determination result indicates that the pages are separated at different positions in the main scanning direction for the front-side image data and the back-side image data, the drawing data generator is configured to:
divide the page of the back-side image data into a first part that is overlapped with the page of the front-side image data in the main scanning direction, and a second part that is not overlapped with the page of the front-side image data in the main scanning direction, using information regarding a position where each page of the front-side image data is separated from the preceding page, and
generate one-page drawing data that contains the page of the front-side image data and the first part of the back-side image data.

4. The apparatus of claim 3, wherein when the determination result indicates that the pages are separated at different positions in the main scanning direction for the front-side image data and the back-side image data, the drawing data generator is further configured to:
  divide at least one page of the front-side image data into a first part that is not overlapped with the back-side image data in the main scanning direction and a second part that is overlapped with the back-side image data in the main scanning direction;
  generate one-page drawing data that contains the first part of the front-side image data that is not overlapped with the back-side image data;
  divide at least one page of the back-side image data into a first part that is not overlapped with the front-side image data in the main scanning direction and a second part that is overlapped with the front-side image data in the main scanning direction; and
  generate one-page drawing data that contains the first part of the back-side image data that is not overlapped with the front-side image data.

5. The apparatus of claim 4, wherein the page allocator generates the determination result indicating that the pages are separated at different positions in the main scanning direction for the front-side image data and the back-side image data, when the reverse path length is not a multiplied value of a page length of the image data that is obtained by multiplying the page length with an integer.

6. An image forming apparatus, comprising:
the apparatus of claim 1;
an image forming device to form an image onto a surface of an image carrier based on the drawing data, the image including a front-side image that corresponds to the front-side image data of the drawing data and a back-side image that corresponds to the back-side image data of the drawing data; and
a sheet transfer device to transfer the continuous roll sheet to the image forming device.

7. An apparatus for controlling an image forming apparatus having an image forming device therein, the apparatus comprising:
an image obtainer to obtain image data to be formed on a continuous roll sheet, the image data including front-side image data to be formed on a front side of the continuous roll sheet and back-side image data to be formed on the back side of the continuous roll sheet;
a reverse path length obtainer to obtain information regarding a reverse path length that indicates a length of path in which the continuous roll sheet travels in the image forming device between the time at which the front-side image data is formed on the front side of the continuous roll sheet and the time at which the back-side image data is formed on the back side of the continuous roll sheet;
a page allocator to:
  allocate a first page of the front-side image data and a first page of the back-side image data at respective positions that are parallel with each other in the main scanning direction, wherein the position of the first page of the front-side image data and the position of the first page of the back-side image data are separated from each other in the sub-scanning direction by a length determined based on the reverse path length; and generate page allocation information that indicates to combine a part of the front-side image data and a part of the back-side image data that are overlapped with each other in the main scanning direction into drawing data; and a drawing data generator to generate drawing data of the image data using the page allocation information, wherein, when a last page of the front-side image data and a first page of the back-side image data are separated from each other in the sub-scanning direction by a predetermined length, the page allocator is further configured to:

extend a sub-scanning length of the last page of the front-side image data by the predetermined length toward the first page of the back-side image data to cause the drawing data generator to generate one-page drawing data that contains the last page of the front-side image data having the extended sub-scanning length; or extend a sub-scanning length of the first page of the back-side image data by the predetermined length toward the last page of the front-side image data to cause the drawing data generator to generate one-page drawing data that contains the first page of the back-side image data having the extended sub-scanning length.

8. An image forming apparatus, comprising:

the apparatus of claim 7;

an image forming device to form an image onto a surface of an image carrier based on the drawing data, the image including a front-side image that corresponds to the front-side image data of the drawing data and a back-side image that corresponds to the back-side image data of the drawing data; and a sheet transfer device to transfer the continuous roll sheet to the image forming device.

9. A method of controlling an image forming apparatus having an image forming device therein, the method comprising:

obtaining image data to be formed on a continuous roll sheet, the image data including front-side image data to be formed on a front side of the continuous roll sheet and back-side image data to be formed on the back side of the continuous roll sheet;

obtaining information regarding a reverse path length that indicates a length of path in which the continuous roll sheet travels in the image forming device between the time at which the front-side image data is formed on the front side of the continuous roll sheet and the time at which the back-side image data is formed on the back side of the continuous roll sheet;

allocating a first page of the front-side image data and a first page of the back-side image data at respective positions that are parallel with each other in the main scanning direction, wherein the position of the first page of the front-side image data and the position of the first page of the back-side image data are separated from each other in the sub-scanning direction by a length determined based on the reverse path length;

generating page allocation information that indicates to combine a part of the front-side image data and a part of the back-side image data that are overlapped with each other in the main scanning direction into drawing data; and generating drawing data of the image data using the page allocation information, wherein the step of generating the drawing data includes generating drawing data that contains the front-side image data, using information regarding a position where each page of the front-side image data is separated from the preceding page;

generating drawing data that contains the front-side image data and the back-side image data that are overlapped with each other in the main scanning direction, using information regarding a position where each page of the front-side image data is separated from the preceding page; and generating drawing data that contains the back-side image data using information regarding a position where each page of the back-side image data is separated from the preceding page.

10. A method of controlling an image forming apparatus having an image forming device therein, the method comprising:

obtaining image data to be formed on a continuous roll sheet, the image data including front-side image data to be formed on a front side of the continuous roll sheet and back-side image data to be formed on the back side of the continuous roll sheet;

obtaining information regarding a reverse path length that indicates a length of path in which the continuous roll sheet travels in the image forming device between the time at which the front-side image data is formed on the front side of the continuous roll sheet and the time at which the back-side image data is formed on the back side of the continuous roll sheet;

allocating a first page of the front-side image data and a first page of the back-side image data at respective positions that are parallel with each other in the main scanning direction, wherein the position of the first page of the front-side image data and the position of the first page of the back-side image data are separated from each other in the sub-scanning direction by a length determined based on the reverse path length;

generating page allocation information that indicates to combine a part of the front-side image data and a part of the back-side image data that are overlapped with each other in the main scanning direction into drawing data; and generating drawing data of the image data using the page allocation information, wherein, when a last page of the front-side image data and a first page of the back-side image data are separated from each other in the sub-scanning direction by a predetermined length, the page allocating step includes extending a sub-scanning length of the last page of the front-side image data by the predetermined length toward the first page of the back-side image data so that one-page drawing data that contains the last page of the front-side image data having the extended sub-scanning length is generated in the step of generating the drawing data; or extending a sub-scanning length of the first page of the back-side image data by the predetermined length toward the last page of the front-side image data so that one-page drawing data that contains the first page of the back-side image data having the extended sub-scanning length is generated in the step of generating the drawing data.

* * * * *